United States Patent
Mori et al.

(10) Patent No.: US 9,212,585 B2
(45) Date of Patent: Dec. 15, 2015

(54) EXHAUST GAS PURIFYING APPARATUS FOR INTERNAL COMBUSTION ENGINE

(75) Inventors: Toshihiro Mori, Gotenba (JP); Yuki Bisaiji, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/118,622

(22) PCT Filed: Jul. 28, 2011

(86) PCT No.: PCT/JP2011/067301
§ 371 (c)(1),
(2), (4) Date: Nov. 19, 2013

(87) PCT Pub. No.: WO2013/014788
PCT Pub. Date: Jan. 31, 2013

(65) Prior Publication Data
US 2014/0208722 A1    Jul. 31, 2014

(51) Int. Cl.
*F01N 3/20* (2006.01)
*F01N 9/00* (2006.01)
*F01N 3/28* (2006.01)
*F01N 3/025* (2006.01)
*F01N 3/035* (2006.01)
*F01N 13/00* (2010.01)
*F01N 3/08* (2006.01)
*F01N 3/10* (2006.01)

(52) U.S. Cl.
CPC .............. *F01N 3/20* (2013.01); *F01N 3/0253* (2013.01); *F01N 3/035* (2013.01); *F01N 3/0821* (2013.01); *F01N 3/0864* (2013.01); *F01N 3/103* (2013.01); *F01N 3/206* (2013.01); *F01N 3/2892* (2013.01); *F01N 9/00* (2013.01); *F01N 9/002* (2013.01); *F01N 13/009* (2014.06); *F01N 2560/025* (2013.01); *F01N 2900/1602* (2013.01); *F01N 2900/1621* (2013.01); *F01N 2900/1622* (2013.01); *Y02T 10/47* (2013.01)

(58) Field of Classification Search
CPC ....... F01N 3/0253; F01N 3/035; F01N 3/206; F01N 3/2892; F01N 2900/1602
See application file for complete search history.

(56) References Cited

U.S. PATENT DOCUMENTS

2005/0022518 A1    2/2005  Noirot
2011/0030350 A1    2/2011  Kato
2012/0085084 A1*   4/2012  Bisaiji ............................ 60/276

(Continued)

FOREIGN PATENT DOCUMENTS

EP    1857647 A1    11/2007
EP    2253823 A2 *  11/2010  .............. F02D 41/02

(Continued)

*Primary Examiner* — Kenneth Bomberg
*Assistant Examiner* — Jonathan Matthias
(74) *Attorney, Agent, or Firm* — Sughrue Mion, PLLC (57) ABSTRACT

An exhaust gas purifying apparatus for an internal combustion engine is provided with: a first catalyst (234) which is disposed in an exhaust passage of the internal combustion engine (200); a second catalyst (235) which is disposed in the exhaust passage on a downstream side of the first catalyst; a reducing agent supplying device (233) which is disposed on an upstream side of the first catalyst and which is configured to supply a reducing agent into the exhaust passage; and a reducing agent supply controlling device (100) which is configured to control the reducing agent supplying device such that an air-fuel ratio on the upstream side of the first catalyst becomes momentarily rich.

11 Claims, 6 Drawing Sheets

(56) References Cited

U.S. PATENT DOCUMENTS

| | | | |
|---|---|---|---|
| 2012/0255278 A1* | 10/2012 | Miao et al. | 60/274 |
| 2014/0208722 A1 | 7/2014 | Mori et al. | |

FOREIGN PATENT DOCUMENTS

| | | |
|---|---|---|
| EP | 2738363 A1 | 6/2014 |
| JP | 2003-035131 A | 2/2003 |
| JP | 2005-054780 A | 3/2005 |
| JP | 2006-307801 A | 11/2006 |
| JP | 2009-030509 A | 2/2009 |
| JP | 2010-071189 A | 4/2010 |
| JP | 2010-203337 A | 9/2010 |
| JP | 2010-248996 A | 11/2010 |
| JP | 2011-033000 A | 2/2011 |
| WO | 2004/079170 A1 | 9/2004 |
| WO | WO 2010150408 A1 * | 12/2010 |

* cited by examiner

EXHAUST GAS PURIFYING APPARATUS FOR INTERNAL COMBUSTION ENGINE

CROSS REFERENCE TO RELATED APPLICATIONS

This application is a National Stage of International Application No. PCT/JP2011/067301 filed Jul. 28, 2011, the contents of all of which are incorporated herein by reference in their entirety.

TECHNICAL FIELD

The present invention relates to an exhaust gas purifying apparatus for an internal combustion engine.

BACKGROUND ART

As a technology of purifying exhaust gas of an internal combustion engine such as, for example, a diesel engine, there is known a technology of providing a diesel oxidant catalyst (DOC) or oxidation catalyst for oxidizing (i.e. burning) hydrocarbon (HC) and carbon monoxide (CO) in the exhaust gas, and a filter catalyst referred to as, for example, a diesel particulate filter (DPF) for collecting particulate matters (PM) composed mainly of carbon in the exhaust gas, or the like, in an exhaust passage of the internal combustion engine (refer to, for example, Patent documents 1 to 3).

If the amount of the particulate matters (hereinafter referred to as "PM" as occasion demands) collected in the filter catalyst increases, clogging of the filter catalyst may increase exhaust pressure and reduce the performance of the internal combustion engine. Thus, when the amount of PM collected in the filter catalyst reaches a certain amount, there is performed processing of supplying a reducing agent (e.g. fuel) to the filter catalyst and increasing the temperature of the filter catalyst to, for example, about 600 degrees C. so that PM is oxidized and removed (hereinafter referred to "PM regeneration processing as occasion demands) (refer to, for example, Patent documents 1 to 3).

In an exhaust gas purifying apparatus which is provided with the oxidization catalyst and the filter catalyst in this order from the upstream side of the exhaust passage, if the PM regeneration processing is performed by supplying the reducing agent into the exhaust gas from a reducing agent supplier which is disposed on the upstream side of the oxidization catalyst, the temperature of the oxidation catalyst increases because the supplied reducing agent reacts even with the oxidation catalyst (i.e. is oxidized) before reaching the filter catalyst. Moreover, in cases where such PM regeneration processing is performed, in order to increase the temperature of the filter temperature, for example, to about 600 degrees C., it is necessary to increase the temperature of the oxidation catalyst to a higher temperature (e.g. at about 700 degrees C.) than that of the filter catalyst, in view of thermal loss between the oxidization catalyst and the filter catalyst. This increases a thermal load on the oxidization catalyst which is disposed on the upstream side of the filter catalyst, and likely accelerates thermal degradation of the oxidization catalyst.

For example, the Patent document 1 discloses a technology of suppressing the thermal degradation of the oxidization catalyst by disposing the reducing agent supplier on the upstream side of the oxidation catalyst (first catalyst) and between the oxidization catalyst and the filter catalyst (second catalyst) to prevent the reducing agent from being wastefully supplied to the oxidization catalyst (first catalyst).

The Patent document 2 discloses a technology of reducing PM combustion temperature by mixing fuel added to exhaust with an additive containing ceria (cerium oxide, CeO) or the like. Moreover, the Patent document 3 discloses a technology of reducing an intake air amount in order to set a rich air-fuel ratio with a small amount of HC if the reducing agent (HC) is supplied by using nitrogen oxide (NOx) reduction or the like.

PRIOR ART DOCUMENT

Patent Document

Patent document 1: Japanese Patent Application Laid Open No. 2010-203337
Patent document 2: Japanese Patent Application Laid Open No. 2005-054780
Patent document 3: Japanese Patent Application Laid Open No. 2003-035131

DISCLOSURE OF INVENTION

Subject to be Solved by the Invention

According to the technology disclosed in the aforementioned Patent document 1, however, the provision of the plurality of reducing agent suppliers may increase manufacturing cost and deteriorate mountability of a vehicle, which is technically problematic.

In view of the aforementioned conventional problems, it is therefore an object of the present invention to provide an exhaust gas purifying apparatus for an internal combustion engine, which is configured to appropriately control the temperature of the second catalyst such as, for example, the filter catalyst disposed on the downstream side, while suppressing the thermal degradation of the first catalyst such as, for example, the oxidization catalyst disposed on the upstream side of the exhaust passage, without causing, for example, the increase in manufacturing cost and the deterioration in mountability of the vehicle.

Means for Solving the Subject

The exhaust gas purifying apparatus for an internal combustion engine of the present invention is, in order to solve the above-mentioned subject, provided with a first catalyst which is disposed in an exhaust passage of the internal combustion engine, a second catalyst which is disposed in the exhaust passage on a downstream side of the first catalyst, a reducing agent supplying device which is disposed on an upstream side of the first catalyst and which is configured to supply a reducing agent into the exhaust passage, and a reducing agent supply controlling device which is configured to control the reducing agent supplying device such that an air-fuel ratio on the upstream side of the first catalyst becomes momentarily rich.

The exhaust gas purifying apparatus for the internal combustion engine of the present invention is an apparatus for purifying the exhaust gas of the internal combustion engine such as, for example, a diesel engine, and is provided with the first and second catalysts which are disposed in the exhaust passage of the internal combustion engine. The first catalyst is an oxidation catalyst which can oxidize (i.e. burn) hydrocarbon (HC) and carbon monoxide (CO) in the exhaust gas. The second catalyst is, for example, a filter catalyst which collects particulate matters (PM) in the exhaust gas. The first and second catalysts are disposed in this order from the upstream side of the exhaust tube. In other words, in the exhaust tube, the first catalyst is disposed on the upstream side of the second catalyst. That is, the exhaust gas purifying apparatus for the internal combustion engine of the present invention is configured such that the exhaust gas emitted to the exhaust passage from the cylinders of the internal combustion engines is purified by the first catalyst and is then further purified by the second catalyst.

In the present invention, the reducing agent supplying device which is configured to supply the reducing agent such as, for example, fuel to the exhaust passage is disposed on the upstream side of the first catalyst.

Particularly in the present invention, the reducing agent supply controlling device controls the reducing agent supplying device such that the air-fuel ratio (A/F) on the upstream side of the first catalyst becomes momentarily rich. In other words, the reducing agent supply controlling device controls the reducing agent supplying device such that the air-fuel ratio of the exhaust gas on the upstream side of the first catalyst becomes lower than an ideal air-fuel ratio (i.e. stoichiometric) (i.e. such that the amount of fuel or the reducing agent is more than an amount to react with oxygen in the exhaust gas in just proportion), momentarily, or typically with a predetermined period. That is, in the present invention, the reducing agent supplying device supplies the reducing agent, for example, periodically or intermittently, such that the air-fuel ratio on the upstream side of the first catalyst becomes momentarily rich, typically with respect to the exhaust gas which is lean in which the air-fuel ratio is higher than the stoichiometric, under the control by the reducing agent supply controlling device. It is thus possible to increase the amount of the reducing agent which is supplied by the reducing agent supplying device to the upstream side of the first catalyst and which passes through the first catalyst (i.e. the reducing agent which reaches the downstream side of the first catalyst without reacting on the first catalyst), and to increase the amount of the fuel which reacts on the second catalyst. It is thus possible to increase the amount of the reducing agent which reacts on the second catalyst while suppressing a temperature rise caused by the reaction of the reducing agent on the first catalyst. It is therefore possible to appropriately control the temperature of the second catalyst, such as, for example, increasing the temperature of the second temperature to a predetermined temperature, while suppressing the thermal degradation of the first catalyst. Here, according to the present invention, it is only necessary to provide one reducing agent supplying device on the upstream side of the first catalyst. Thus, there is such an advantage that it does not cause the increase in manufacturing cost and the deterioration in mountability of the vehicle.

As explained above, according to the exhaust gas purifying apparatus for the internal combustion engine of the present invention, it is possible to appropriately control the temperature of the second catalyst such as, for example, a filter catalyst which is disposed on the downstream side, while suppressing the thermal degradation of the first catalyst such as, for example, an oxidation catalyst which is disposed on the upstream side of the exhaust passage, for example, without causing the increase in manufacturing cost and the deterioration in mountability of the vehicle.

In one aspect of the exhaust gas purifying apparatus for the internal combustion engine of the present invention, the second catalyst has oxygen storage capacity.

According to this aspect, the second catalyst has the oxygen storage capacity (OSC) for storing oxygen in the exhaust gas when the air-fuel ratio is lean and for releasing the stored oxygen when the air-fuel ratio is rich. It is thus possible to improve the reaction efficiency of the reducing agent on the second catalyst.

In the aspect where the second catalyst has oxygen storage capacity, the exhaust gas purifying apparatus can be configured such that a second catalyst bed temperature detecting device which is configured to detect a bed temperature of the second catalyst is further comprised, and the reducing agent supply controlling device determines a supply amount of the reducing agent by the reducing agent supplying device on the basis of the detected bed temperature such that the reducing agent reacts with oxygen released from the second catalyst in a particular region out of a plurality of regions of the second catalyst which are arranged in a direction from the upstream side to the downstream side of the exhaust passage.

In this case, the reducing agent can react in the particular region out of the plurality of regions of the second catalyst, and the temperature of the particular region can be certainly increased. It is thus possible to increase the temperature of the particular region of the second catalyst, depending on, for example, the collected state of PM (e.g. accumulated position and accumulated amount of PM) in the second catalyst such as, for example, a filter catalyst.

In the aspect where the second catalyst bed temperature detecting device is further comprised, the reducing agent supply controlling device can be configured such that it determines the supply amount depending on reaction efficiency of the reaction between the reducing agent and oxygen released from the second catalyst.

In this case, it is possible to certainly increase the temperature of the particular region of the second catalyst, as well as suppressing or preventing that one portion of the reducing agent reaches the downstream side of the second catalyst without reacting on the second catalyst (i.e. that one portion of the reducing agent passes through the second catalyst). This makes it possible to reduce or prevent that one portion of the fuel is released into the air.

In another aspect of the exhaust gas purifying apparatus for the internal combustion engine of the present invention, the second catalyst has hydrocarbon adsorption capacity.

According to this aspect, the second catalyst has the hydrocarbon adsorption capacity (HC adsorption capacity) for adsorbing hydrocarbon (HC), which makes it possible to suppress or prevent that hydrocarbon in the exhaust gas passes through the second catalyst. It is thus possible to reduce or prevent that hydrocarbon is released into the air.

In the aspect where the second catalyst has hydrocarbon adsorption capacity, the exhaust gas purifying apparatus can be configured such that a first exhaust gas temperature detecting device which is configured to detect a temperature of exhaust gas in the exhaust passage on the downstream side of the second catalyst, a second exhaust gas temperature detecting device which is configured to detect a temperature of exhaust gas in the exhaust passage on the downstream side of the first catalyst and on the upstream side of the second catalyst, and a first hydrocarbon amount estimating device which is configured to estimate an adsorption amount of hydrocarbon adsorbed by the second catalyst on the basis of the temperature detected by the first exhaust gas temperature detecting device and the temperature detected by the second exhaust gas temperature detecting device, are further comprised, and the reducing agent supply controlling device determines a supply amount of the reducing agent by the reducing agent supplying device on the basis of the estimated adsorption amount.

In this case, it is possible to appropriately control the temperature of the second catalyst, as well as more certainly suppressing or preventing that hydrocarbon in the exhaust gas passes through the second catalyst.

In the aspect where the second catalyst has hydrocarbon adsorption capacity, the exhaust gas purifying apparatus can be configured such that an air-fuel ratio detecting device which is configured to detect the air-fuel ratio in the exhaust passage on the downstream side of the second catalyst, and a second hydrocarbon amount estimating device which is configured to estimate an adsorption amount of hydrocarbon adsorbed by the second catalyst on the basis of the air-fuel ratio detected by the air-fuel ratio detecting device, are further comprised, and the reducing agent supply controlling device determines a supply amount of the reducing agent by the reducing agent supplying device on the basis of the estimated adsorption amount.

In this case, it is possible to appropriately control the temperature of the second catalyst, as well as more certainly suppressing or preventing that hydrocarbon in the exhaust gas passes through the second catalyst.

In the aspect where the second catalyst has hydrocarbon adsorption capacity, the reducing agent supply controlling device can be configured such that it determines a supply amount of the reducing agent by the reducing agent supplying device such that amplitude of oscillation of the air-fuel ratio on the upstream side of the first catalyst gradually decreases at the end of the control of the reducing agent supplying device.

According to this aspect, it is possible to suppress or prevent that the immediate reaction of hydrocarbon adsorbed by the second catalyst with oxygen in the exhaust gas generates heat and causes over-temperature (OT) of the second catalyst (i.e. an excessive temperature rise of the second catalyst).

In another aspect of the exhaust gas purifying apparatus for the internal combustion engine of the present invention, the exhaust gas purifying apparatus is further provided with an air-fuel ratio detecting device which is configured to detect the air-fuel ratio in the exhaust passage on the downstream side of the second catalyst, and the reducing agent supply controlling device determines a supply amount of the reducing agent by the reducing agent supplying device on the basis of the detected air-fuel ratio.

According to this aspect, it is possible to appropriately control the temperature of the second catalyst, as well as more certainly suppressing or preventing that hydrocarbon in the exhaust gas passes through the second catalyst.

In another aspect of the exhaust gas purifying apparatus for the internal combustion engine of the present invention, the exhaust gas purifying apparatus is further provided with a mixing device which is configured to mix exhaust gas, in the exhaust passage on the downstream side of the first catalyst and on the upstream side of the second catalyst.

According to this aspect, the exhaust gas having the lean air-fuel ratio and the exhaust gas having the rich air-fuel ratio can be mixed by the mixing device, by which the reaction efficiency of the reducing agent on the second catalyst can be improved.

In the aspect where the air-fuel ratio detecting device which detects the air-fuel ratio in the exhaust passage on the downstream side of the second catalyst is further comprised, and the reducing agent supply controlling device determines a supply amount of the reducing agent by the reducing agent supplying device on the basis of the detected air-fuel ratio, the exhaust gas purifying apparatus can be further provided with a passing through amount calculating device which is configured to calculate a passing through amount of the reducing agent which passes through the second catalyst out of the entire reducing agent, on the basis of the detected air-fuel ratio, and a first failure detecting device which is configured to detect a failure due to degradation of the first and second catalysts on the basis of the calculated passing through amount and the supply amount of the reducing agent by the reducing agent supplying device.

In this case, it is possible to accurately detect the failure due to the degradation of the first and second catalysts.

In the aspect where the air-fuel ratio detecting device which detects the air-fuel ratio in the exhaust passage on the downstream side of the second catalyst is further comprised, and the reducing agent supply controlling device determines a supply amount of the reducing agent by the reducing agent supplying device on the basis of the detected air-fuel ratio, the exhaust gas purifying apparatus can be further provided with a second failure detecting device which is configured to detect a failure due to degradation of the first and second catalysts on the basis of the determined supply amount.

In this case, it is possible to accurately detect the failure due to the degradation of the first and second catalysts. The second failure detecting device determines that there is the failure due to the degradation of the first or second catalyst if the determined supply amount of the reducing agent is reduced by a predetermined amount or more.

In the aspect where the air-fuel ratio detecting device which detects the air-fuel ratio in the exhaust passage on the downstream side of the second catalyst is further comprised, and the reducing agent supply controlling device determines a supply amount of the reducing agent by the reducing agent supplying device on the basis of the detected air-fuel ratio, the exhaust gas purifying apparatus can be further provided with a third failure detecting device which is configured to detect a failure due to degradation of the first and second catalysts on the basis of the air-fuel ratio detected by the air-fuel ratio detecting device after the determined supply amount of reducing agent is supplied by the reducing agent supplying device.

In this case, it is possible to accurately detect the failure due to the degradation of the first and second catalysts. The third failure detecting device determines that there is the failure due to the degradation of the first or second catalyst if the air-fuel ratio detected by the air-fuel ratio detecting device (i.e. the air-fuel ratio on the downstream side of the second catalyst) is less than or equal to a predetermined amount (i.e. rich) even though the supply amount of the reducing agent is reduced.

The operation and other advantages of the present invention will become more apparent from an embodiment explained below.

MODE FOR CARRYING OUT THE INVENTION

Hereinafter, an embodiment of the present invention will be explained with reference to the drawings.

Firstly, a configuration of an engine system including an exhaust gas purifying apparatus for an internal combustion engine in the embodiment of the present invention will be explained with reference to FIG. 1.

Figure 1:
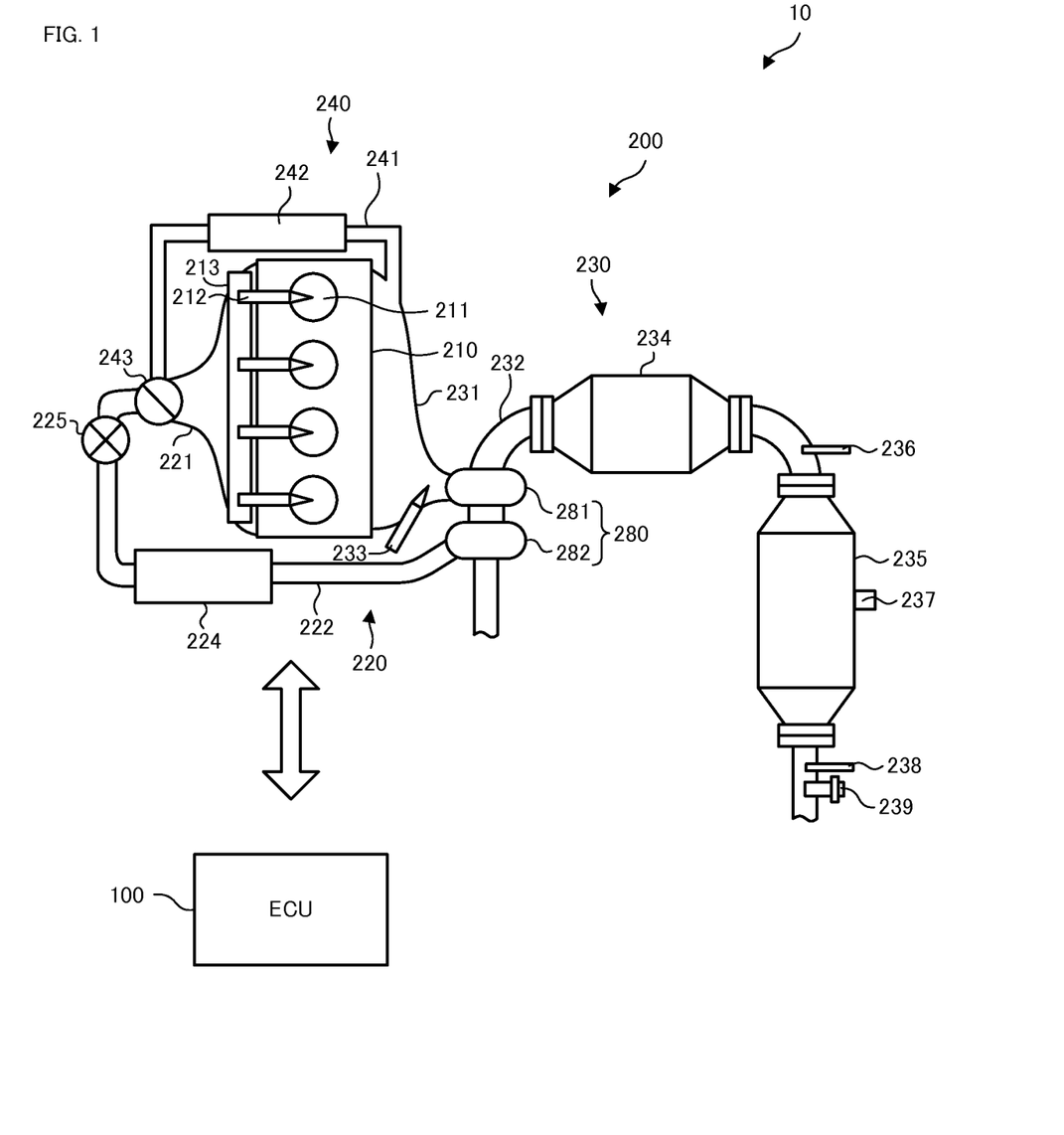
FIG. 1 is a schematic configuration diagram schematically illustrating a configuration of an engine system in an embodiment of the present invention.

FIG. 1 is a schematic configuration diagram schematically illustrating the configuration of the engine system in the embodiment.

In FIG. 1, an engine system 10 is mounted on in a not-illustrated vehicle, and is provided with an engine control unit (ECU) 100 and an engine 200.

The ECU 100 is provided with a central processing unit (CPU), a read only memory (ROM), a random access memory (RAM), and the like. The ECU 100 is an electronic control unit which is configured to control the entire operation of the engine 200. The ECU 100 is configured to perform various controls in accordance with a control program stored, for example, in the ROM or the like. The ECU 100 is configured to function as one example of the "reducing agent supply controlling device" of the present invention.

The engine 200 is a four-cycle diesel engine (a compression ignition internal combustion engine) which is one example of the "internal combustion engine" of the present invention, and functions as a power source of the vehicle. The engine 200 is configured to convert reciprocating motion of a piston according to explosive power caused at the time of the compression ignition of an air-fuel mixture containing fuel in a cylinder 211, into rotary motion of a crankshaft via a connection rod. The engine 200 is of an in-line four cylinder type; however, in the present invention, the number of cylinders and cylinder arrangement are not particularly limited.

The engine 200 is provided with an engine body 210 having four cylinders 211, an intake system 220 which sucks the air into a combustion chamber of each cylinder 211, an exhaust system 230 which purifies exhaust gas from each cylinder 211 and emits it to the exterior, an exhaust gas recirculation (EGR) system 240 which refluxes and recirculates one portion of the exhaust gas from each cylinder 211 into the intake side, and a turbocharger 280 which compresses the air in the intake system 220 by using exhaust energy in the exhaust system 230 and which supercharges the air to the combustion chamber of each cylinder 211.

Each cylinder 211 of the engine 200 is provided with a fuel injector 212 which directly injects the fuel into the combustion chamber. The fuel injector 212 of each cylinder 211 is connected to a common rail 213. The common rail 213 stores therein high-pressure fuel pressurized by a not-illustrated fuel pump. From the inside of the common rail 213, the fuel is supplied to each fuel injector 212.

The fuel injector 212 is configured to inject the fuel into the cylinder, a plurality of times per one cycle. In other words, the fuel injector 212 can perform main injection and one or a plurality of times of minute injection (i.e. pilot injection) which is performed before the main injection, in one cycle.

The intake system 220 includes an intake manifold 221 which is communicated with the combustion chamber of each cylinder 211, an intake tube 222 which is communicated with the upstream side of the intake manifold 221, an inter cooler 224 which cools down intake air on the downstream side of the turbocharger 280 in the intake tube 222, and a throttle 225 which is configured to adjust the amount of the intake air to the cylinders 211 of the engine body 210. The opening degree of the throttle 255 is controlled by the ECU 100.

The exhaust system 230 is provided with an exhaust manifold 231 which is communicated with the combustion chamber of each cylinder 211, an exhaust tube 232 which is communicated with the downstream side of the exhaust manifold 231, an exhaust addition injector 233 which adds the fuel to the exhaust gas in the exhaust manifold 231, a first catalyst 234 which purifies the exhaust gas on the downstream side of the turbocharger 280 in the exhaust tube 232, and a second catalyst 235 which purifies the exhaust gas on the downstream side of the first catalyst 234 in the exhaust tube 232. The exhaust system 230 is also provided with a temperature sensor 236 which is disposed in the exhaust tube 232 between the first catalyst 234 and the second catalyst 235, a temperature sensor 237 which detects a bed temperature of the second catalyst 235, and a temperature sensor 238 and an air-fuel ratio sensor 239 which are disposed in the exhaust tube on the downstream side of the second catalyst 235.

The exhaust addition injector 233 is one example of the "reducing agent supplying device" of the present invention, and is a fuel injection apparatus which is configured to inject the fuel, as one example of the "reducing agent" of the present invention, into the exhaust manifold 231. The fuel is injected from the exhaust addition injector 233 by which the fuel is added to the exhaust gas. The amount of the fuel injection of the exhaust addition injector 233 (in other words, the amount of the fuel added to the exhaust gas), injection timing, injection time, and the like are controlled by the ECU 100.

The first catalyst 234 is an oxidation catalyst (Diesel Oxidant Catalyst: DOC) which can oxidize (i.e. burn) hydrocarbon (HC) and carbon monoxide (CO) in the exhaust gas. The first catalyst 234 is one example of the "first catalyst" of the present invention. The first catalyst 234 may be a NOx storage reduction catalyst (LNT: Lean NOx Trap Catalyst) which stores NOx in an oxidizing atmosphere and which releases and reduces NOx in a reducing atmosphere.

The second catalyst 235 is a diesel particulate active reduction system (DPR) and includes a filter catalyst (DPF) which collects particulate matters (PM) in the exhaust gas. The second catalyst 235 also contains an oxygen adsorption and desorption material which can store oxygen (e.g. ceria, etc.) and has oxygen storage capacity (OSC). The second catalyst 235 also contains a HC adsorption material which can adsorb HC (e.g. zeolite, etc.), and has HC adsorption capacity. In other words, the second catalyst 235 is a filter catalyst having the oxygen storage capacity and the HC adsorption capacity. The second catalyst 235 is one example of the "second catalyst" of the present invention.

The first catalyst 234 and the second catalyst 235 are disposed in this order from the upstream side of the exhaust tube 232. In other words, in the exhaust tube 232, the first catalyst 234 is disposed on the upstream side of the second catalyst 235. That is, the engine system 10 is configured such that the exhaust gas emitted to the exhaust manifold 231 from the cylinders 211 of the engine 200 is purified by the first catalyst 234 and is then further purified by the second catalyst 235.

The temperature sensor 236 is one example of the "first exhaust gas temperature detecting device" of the present invention, and detects the temperature of the exhaust gas in the exhaust tube 232 on the downstream side of the first catalyst 234 and on the upstream side of the second catalyst 235 (i.e. between the first catalyst 234 and the second catalyst 235). The temperature sensor 236 outputs a detection signal which indicates the detected temperature, to the ECU 100.

The temperature sensor 237 is one example of the "second exhaust gas temperature detecting device" of the present invention, and detects the bed temperature of the second catalyst 235. The temperature sensor 237 outputs a detection signal which indicates the detected temperature, to the ECU 100.

The temperature sensor 238 is one example of the "second exhaust gas temperature detecting device" of the present invention, and detects the temperature of the exhaust gas in the exhaust tube 232 on the downstream side of the second catalyst 235. The temperature sensor 238 outputs a detection signal which indicates the detected temperature, to the ECU 100.

The air-fuel ratio sensor 239 is one example of the "air-fuel ratio detecting device" of the present invention, and detects an air-fuel ratio (A/F) of the exhaust gas in the exhaust tube 232 on the downstream side of the second catalyst 235. The air-fuel ratio sensor 239 outputs a detection signal which indicates the detected air-fuel ratio, to the ECU 100.

The EGR system 240 includes an EGR passage 241 which bypasses the combustion chambers of the respective cylinders 211 to communicate the exhaust manifold 231 with the intake manifold 221 and to recirculate the exhaust gas from each cylinder 211, an EGR cooler 242 which cools down the exhaust gas which is recirculated through the EGR passage 241, and an EGR valve 243 which is configured to adjust an exhaust gas recirculation amount (i.e. the amount of the exhaust gas recirculated) to the intake manifold 221. The opening degree (or opening/closing state) of the EGR valve 243 is controlled by the EUC 100.

The turbocharger 280 is a supercharger of an exhaust turbine type, and is configured to pressurize the air in the intake tube 222 by rotating a turbine with the energy of the exhaust gas which flows in the exhaust gas 232. Specifically, the turbocharger 280 includes a turbine wheel 281 which is disposed in the exhaust tube 232, a compressor wheel 282 which is disposed in the intake tube 222, and a turbine shaft which connects the turbine wheel and the compressor wheel. The exhaust gas emitted from the engine 200 rotates the turbine wheel 281 when passing through the exhaust tube 232, thereby rotating the compressor wheel 282 via the turbine shaft and pressurizes the air in the intake tube 222.

Next, the control of the exhaust addition injector 233 which is performed by the ECU 100 upon PM regeneration processing will be explained with reference to FIG. 2. In the PM regeneration processing in the embodiment, the fuel is added to the exhaust gas from the exhaust addition injector 233 and the fuel is reacted on the second catalyst 235, to increase the temperature of the second catalyst 235 to, for example, about 600 degrees C. This allows the oxidization and removal of PM collected on the second catalyst 235.

Figure 2:
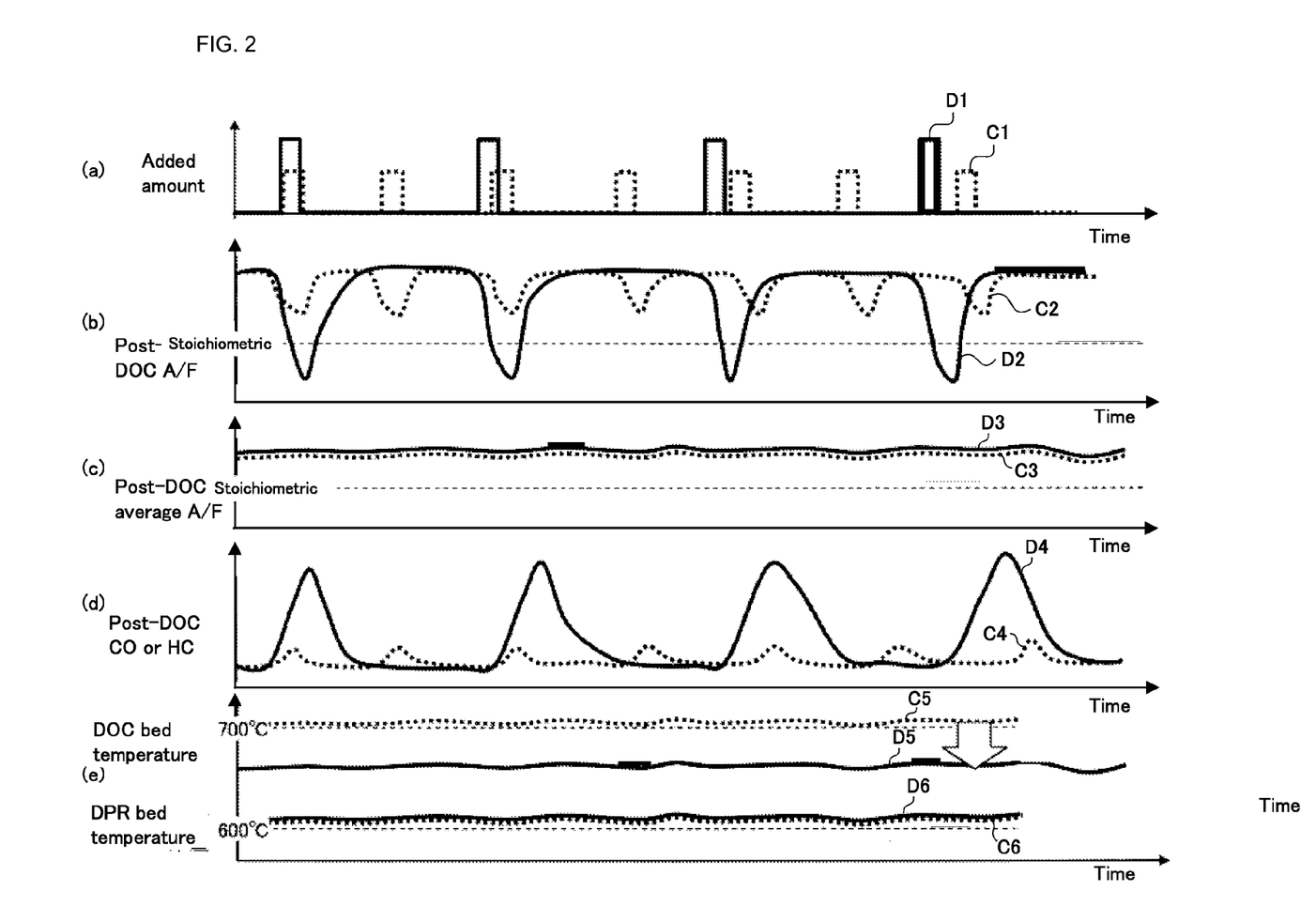
FIG. 2 is a timing chart for explaining the control of an exhaust addition injector in the embodiment of the present invention.

FIG. 2 is a timing chart for explaining the control of the exhaust addition injector 233 in the embodiment. FIG. 2 illustrates, from the top, (a) the addition amount of the fuel by the exhaust addition injector 233, (b) the air-fuel ratio on the downstream side of the first catalyst 234 (post-DOC A/F), (c) an average air-fuel ratio on the downstream side of the first catalyst 234 (post-DOC average A/F), (d) the density of carbon monoxide or hydrocarbon on the downstream side of the first catalyst 234 (post-DOC CO or HC), and (e) changes with time in the bed temperature of the first catalyst 234 (DOC bed temperature) and the bed temperature of the second catalyst 235 (DPR bed temperature). Moreover, in FIG. 2, solid lines D1, D2, D3, D4, D5 and D6 indicate the control in the embodiment, and dashed lines C1, C2, C3, C4, C5 and C6 indicate control in a comparative example.

In FIG. 2, particularly in the embodiment, the ECU 100 controls the addition amount by the exhaust addition injector 233 such that the air-fuel ratio (A/F) on the upstream side of the first catalyst 234 becomes momentarily rich (refer to the solid line D1). In other words, the ECU 100 controls the exhaust addition injector 233 such that the air-fuel ratio of the exhaust gas on the upstream side of the first catalyst 234 becomes momentarily lower than an ideal air-fuel ratio (i.e. stoichiometric) (i.e. such that the amount of the fuel is more than an amount to react with oxygen in the exhaust gas in just proportion). That is, in the embodiment, the exhaust addition injector 233 supplies the fuel, momentarily and periodically or intermittently, such that the air-fuel ratio on the upstream side of the first catalyst 234 becomes momentarily rich, with respect to the exhaust gas which is lean in which the air-fuel ratio is higher than the stoichiometric, under the control by the ECU 100. Incidentally, FIG. 2 illustrates that the air-fuel ratio on the downstream side of the first catalyst 234 becomes momentarily and periodically or intermittently rich, due to the addition of the fuel by the exhaust addition injector 233 in such a manner that the air-fuel ratio on the upstream side of the first catalyst 234 becomes momentarily rich (refer to the solid line D2).

It is thus possible to increase the amount of the fuel which is supplied (i.e. added) by the exhaust addition injector 233 to the upstream side of the first catalyst 234 and which passes through the first catalyst 234 (i.e. the fuel which reaches the downstream side of the first catalyst 234 without reacting on the first catalyst 234), and to increase the amount of the fuel that reacts on the second catalyst 235 (i.e. the amount of CO and HC). In other words, it is possible to increase the fuel which passes through the first catalyst 234, periodically or intermittently (refer to the solid line D4). To put it differently, it is possible to make the air-fuel ratio between the first catalyst 234 and the second catalyst 235 (i.e. the air-fuel ratio on the downstream side of the first catalyst 234) periodically or intermittently rich (refer to the solid line D2). It is thus possible to alternately supply the second catalyst 235 with the exhaust gas in which the air-fuel ratio is rich and the exhaust gas in which the air-fuel ratio is lean.

Therefore, it is possible to increase the amount of the fuel which reacts on the second catalyst 235 while suppressing a temperature rise caused by the reaction of the fuel on the first catalyst 234. This makes it possible to appropriately control the temperature of the second catalyst 235, such as increasing the temperature of the second catalyst 235 to, for example, 600 degrees C., while suppressing the thermal degradation of the first catalyst 234 due to the thermal load.

Here, according to the comparative example illustrated in the dashed line C1, since the addition amount of the fuel per time by the exhaust addition injector 233 is less than that in the embodiment illustrated in the solid line D1, the amount of the fuel which passes through the first catalyst 234 is low (in other words, most of the added fuel reaches on the first catalyst 234). Thus, as in the comparative example, if the number of times of the addition of the fuel by the exhaust addition injector 233 is increased (in the comparative example, the addition amount per time is about half the addition amount in the embodiment, and the number of times of the addition is about twice the number of times of the addition in the embodiment) in order to increase the temperature of the second catalyst 235 to, for example, 600 degrees C., then, the fuel which reacts on the first catalyst 234 increases, and the temperature of the first catalyst 234 increases to, for example, about 700 degrees C. (refer to the dashed line C5). This results in the acceleration of the thermal degradation of the first catalyst 234.

According to the embodiment, however, as described above, the ECU 100 controls the addition amount by the exhaust addition injector 233 such that the air-fuel ratio on the upstream side of the first catalyst 234 becomes momentarily rich. It is thus possible to appropriately control the temperature of the second catalyst 235 while suppressing the thermal degradation of the first catalyst 234.

Moreover, according to the embodiment, it is only necessary to provide one exhaust addition injector 233 on the upstream side of the first catalyst 234. Thus, there is such an advantage that it does not cause the increase in manufacturing cost and the deterioration in mountability of the vehicle.

In addition, particularly in the embodiment, the second catalyst 235, as described above, contains the oxygen adsorption and desorption material which can store oxygen (e.g. ceria, etc.), and has the oxygen storage capacity. Thus, when the air-fuel ratio is rich, oxygen which is released from the oxygen adsorption and desorption material such as, for example, ceria contained in the second catalyst 235 can be reached with the fuel in the exhaust gas, and the reaction efficiency of the fuel on the second catalyst 235 can be improved.

Moreover, particularly in the embodiment, the second catalyst 235, as described above, contains the HC adsorption material which can adsorb HC (e.g. zeolite, etc.), and has the HC adsorption capacity. It is thus possible to suppress or prevent that HC in the exhaust gas passes through the second catalyst 235. It is thus possible to reduce or prevent that HC is released into the air.

Now, the control of the exhaust addition injector 233 illustrated in FIG. 2 is performed after the activation of the second catalyst 235. In other words, the ECU 100 performs the control of the exhaust addition injector 233 illustrated in FIG. 2 if the bed temperature of the second catalyst 235 which is detected by the temperature sensor 237 is greater than or equal to a light-off temperature (a reactable temperature). This can reduce or prevent that the fuel added by the exhaust addition injector 233 passes through the second catalyst 235 and is released into the air.

First Modified Example

Figure 3:
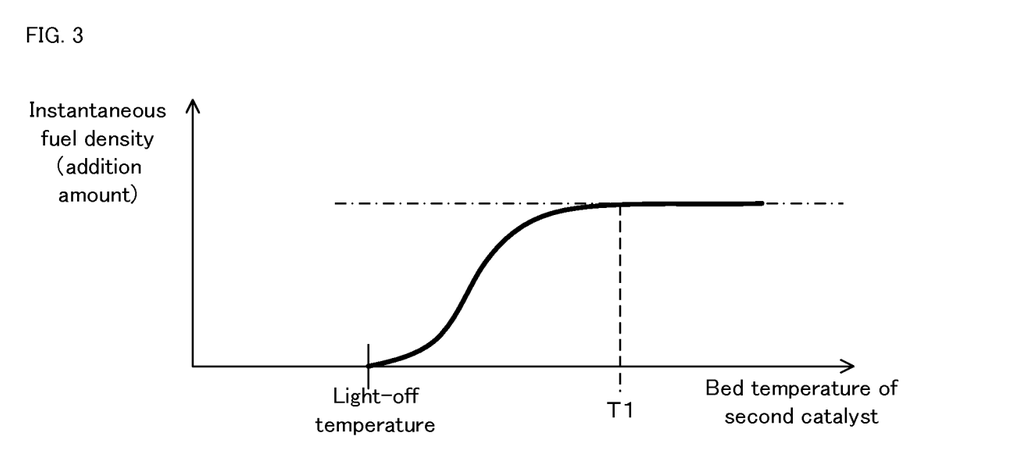
FIG. 3 is a graph for explaining the control of the exhaust addition injector in a first modified example.

FIG. 3 is a graph for explaining the control of the exhaust addition injector 233 in a first modified example. FIG. 3 illustrates a change in instantaneous fuel density with respect to the bed temperature of the second catalyst 235, in the control of the exhaust addition injector 233 in the first modified example.

As illustrated in FIG. 3, particularly in the first modified example, the ECU 100 increases the addition amount by the exhaust addition injector 233 such that the instantaneous fuel density (i.e. the instantaneous density of the fuel in the exhaust gas) increases in response to a bed temperature rise of the second catalyst 235 after the bed temperature of the second catalyst 235 becomes greater than or equal to the light-off temperature. The ECU 100 also maintains a constant addition amount by the exhaust addition injector 233 such that the instantaneous fuel density is constant when the bed temperature of the second catalyst 235 is greater than or equal to a predetermined temperature T1 (a temperature higher than the light-off temperature). In other words, the ECU 100 determines the addition amount by the exhaust addition injector 233 on the basis of the bed temperature of the second catalyst 235 which is detected by the temperature sensor 237 such that the fuel is supplied to the second catalyst 235 at the fuel density that allows the reaction on the second catalyst 235. According to the first modified example as described above, it is more certainly possible to reduce or prevent that the fuel added by the exhaust addition injector 233 passes through the second catalyst 235 and is released into the air.

Second Modified Example

Figure 4:
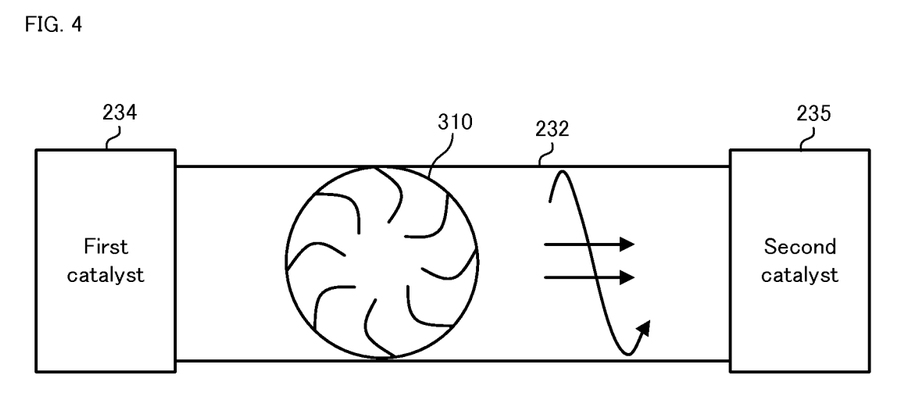
FIG. 4 is a schematic diagram illustrating a shaft-less swirler in a second modified example.

FIG. 4 is a schematic diagram illustrating a shaft-less swirler 310 in a second modified example. Incidentally, the shaft-less swirler 310 is one example of the "mixing device" of the present invention.

As illustrated in FIG. 4, particularly in the second modified example, the shaft-less swirler (swirler vanes) 310 is disposed in the exhaust tube 232 between the first catalyst 234 and the second catalyst 235. Thus, it is possible to swirl (i.e. mix) the exhaust gas in a direction from the first catalyst 234 to the second catalyst 235 (or in a direction from the second catalyst 235 to the first catalyst 234), in the exhaust tube 232 between the first catalyst 234 and the second catalyst 235. It is therefore possible to swirl the exhaust gas of which air-fuel ratio is lean and the exhaust gas of which air-fuel ratio is rich which flow in the exhaust tube 232 from the first catalyst 234 to the second catalyst 235, by which the reaction efficiency of the fuel on the second catalyst 235 can be improved. Incidentally, the shaft-less swirler 310 is a swirler without a central shaft which has the vanes only in a peripheral portion thereof but not in a central portion thereof, and thus, the exhaust gas which passes through the central portion of the shaft-less swirler 310 flows faster than the exhaust gas which passes through and swirls in the peripheral portion of the shaft-less swirler 310. Thus, the shaft-less swirler 310 can preferably swirl or mix the exhaust gas in the direction from the first catalyst 234 to the second catalyst 235 (or in the direction from the second catalyst 235 to the first catalyst 234).

Third Modified Example

Figure 5:
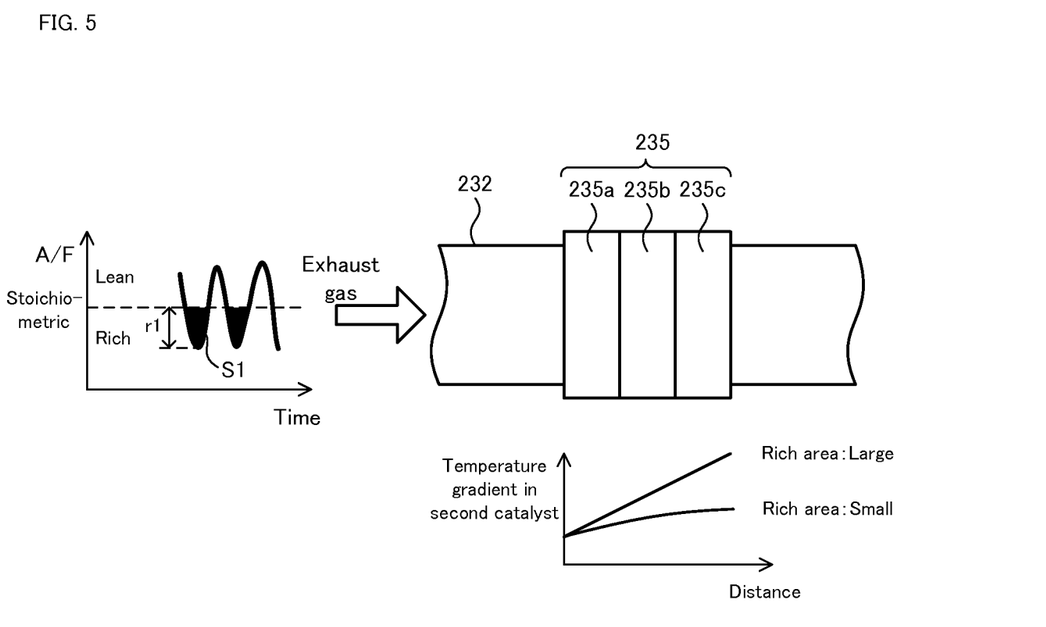
FIG. 5 is a conceptual diagram for explaining the control of the exhaust addition injector in a third modified example.

FIG. 5 is a conceptual diagram for explaining the control of the exhaust addition injector 233 in a third modified example.

In FIG. 5, the second catalyst 235 has a plurality of regions 235*a*, 235*b* and 235*c* which are arranged in a direction from the upstream side to the downstream side of the exhaust tube 232.

Particularly in the third modified example, the ECU 100 determines the addition amount of the fuel by the exhaust addition injector 233 on the basis of the temperature detected by the temperature sensor 237 (i.e. the temperature of the second catalyst 235) such that the fuel reacts with oxygen which is released from the second catalyst 235 (more specifically, the oxygen adsorption and desorption material such as, for example, ceria contained in the second catalyst 235) in a particular region out of the plurality of regions 235*a*, 235*b* and 235*c* of the second catalyst 235. Specifically, if the fuel reacts with the oxygen, for example, in the region 235*c* which is located on the relatively downstream side after the temperature detected by the temperature sensor 237 becomes greater than or equal to the light-off temperature, the ECU 100 determines the addition amount of the fuel by the exhaust addition injector 233 so as to further increase a rich depth r1 and a rich area S1 which indicate how much richer the air-fuel ratio is than the stoichiometric. If the fuel reacts with the oxygen in the region 253*a* which is located on the relatively upstream side, the ECU 100 determines the addition amount of the fuel by the exhaust addition injector 233 so as to further reduce the rich depth r1 and the rich area S1. Incidentally, an increase in the rich area S1 or the rich depth r1 increases the temperature gradient in which the temperature increases from the upstream side to the downstream side of the second catalyst 235. It is thus possible to further increase the temperature of the region on the downstream side of the second catalyst 235 in comparison with the temperature of the region on the upstream side by further increasing the rich area S1 or the rich depth r1.

Thus, the third modified example allows the fuel to react in the particular region out of the plurality of regions 235*a*, 235*b* and 235*c* of the second catalyst 235 and to certainly increase the temperature of the particular region. It is thus possible to increase the temperature of the particular region of the second catalyst 235 depending on, for example, the accumulation state of PM in the second catalyst 235 (e.g. accumulated position and accumulated amount of PM). It is therefore possible to efficiently remove PM in the second catalyst 235. This makes it possible to suppress a reduction in fuel efficiency while suppressing the thermal degradation of the second catalyst 235.

The ECU 100 may also determine the addition amount of the fuel by the exhaust addition injector 233 depending on the reaction efficiency of the reaction between the fuel and oxygen in each of the plurality of regions 235a, 235b and 235c of the second catalyst 235. In this case, it is possible to certainly increase the temperature of the particular region out of the plurality of regions 235a, 235b and 235c of the second catalyst 235, as well as suppressing or preventing that one portion of the fuel passes through the second catalyst 235. This makes it possible to reduce or prevent that one portion of the fuel is released into the air.

Fourth Modified Example

In FIG. 1, particularly in a fourth modified example, the ECU 100 estimates the adsorption amount of hydrocarbon adsorbed by the second catalyst 235 (hereinafter referred to as "a HC adsorption amount" as occasion demands) on the basis of the temperature detected by the temperature sensor 236 and the temperature detected by the temperature sensors 238. The ECU 100 also determines the addition amount of the fuel by the exhaust addition injector 233 on the basis of the estimated HC adsorption amount. Specifically, the ECU 100 determines the addition amount of the fuel by the exhaust addition injector 233 such that the rich depth r1 or the rich area S1 (refer to FIG. 5) decreases as the estimated HC adsorption amount increases. In other words, the ECU 100 reduces the addition amount of the fuel by the exhaust addition injector 233 such that the air-fuel ratio becomes momentarily rich as the HC adsorption amount of the second catalyst 235 increases. It is thus possible to reduce or prevent that one portion of the fuel passes through the second catalyst 235 and is released into the air.

The ECU 100 may estimate the HC adsorption amount of the second catalyst 235 on the basis of the air-fuel ratio detected by the air-fuel ratio sensor 239 and may determine the addition amount of the fuel by the exhaust addition injector 233 on the basis of the estimated HC adsorption amount. Even in this case, if the ECU 100 determines the addition amount of the fuel by the exhaust addition injector 233 such that the rich depth r1 or the rich area S1 decreases as the estimated HC adsorption amount increases, then, it is possible to reduce or prevent that one portion of the fuel passes through the second catalyst 235 and is released into the air.

Fifth Modified Example

Figure 6:
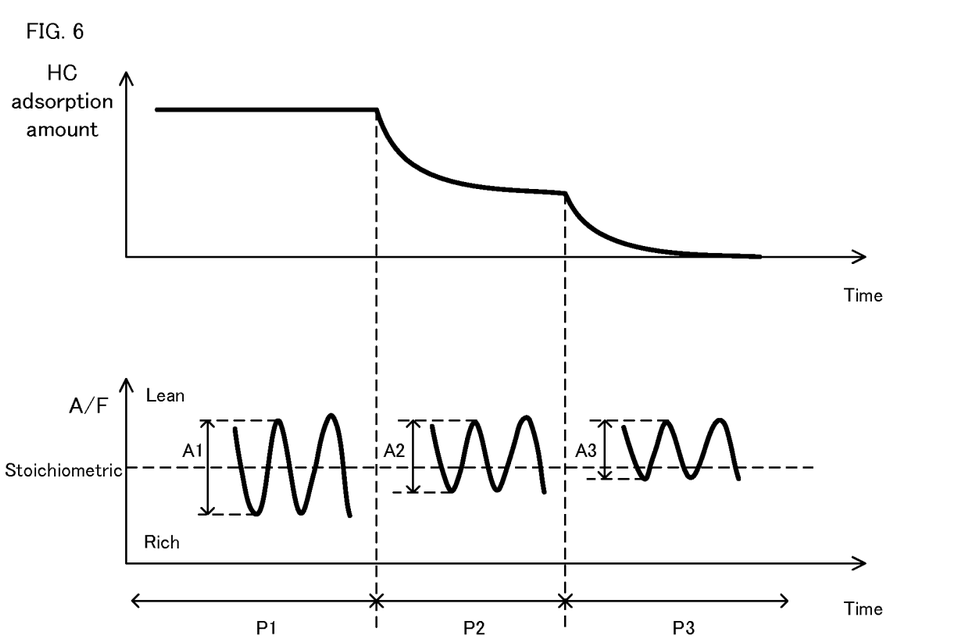
FIG. 6 is a graph for explaining the control of the exhaust addition injector in a fifth modified example.

FIG. 6 is a graph for explaining the control of the exhaust addition injector 233 in a fifth modified example. FIG. 6 illustrates a change with time in the air-fuel ratio (A/F) on the upstream side of the first catalyst 234 at the end of the control of the exhaust addition injector 233 in the fifth modified example, and a time with change in the HC adsorption amount of the second catalyst 235.

In FIG. 6, particularly in the fifth modified example, the ECU 100 determines the addition amount of the fuel by the exhaust addition injector 233 such that the amplitude of oscillation of the air-fuel ratio on the upstream side of the first catalyst gradually decreases at the end of the control of the exhaust addition injector 233. Specifically, for example, the ECU 100 determines the addition amount of the fuel by the exhaust addition injector 233 such that the air-fuel ratio on the upstream side of the first catalyst 234 oscillates with amplitude A1 in a period P1 at the end of the control of the exhaust addition injector 233, determines the addition amount of the fuel by the exhaust addition injector 233 such that the air-fuel ratio on the upstream side of the first catalyst 234 oscillates with amplitude A2 which is smaller than the amplitude A1 in a period P2 which is after the period A1, and determines the addition amount of the fuel by the exhaust addition injector 233 such that the air-fuel ratio on the upstream side of the first catalyst 234 oscillates with amplitude A3 which is smaller than the amplitude A2 in a period P3 which is after the period P2. It is thus possible to suppress or prevent that the immediate reaction of HC adsorbed by the second catalyst 235 with oxygen in the exhaust gas generates heat and causes over-temperature (OT) of the second catalyst 235. As the adsorption amount of HC adsorbed by the second catalyst 235 increases, the possibility of the OT of the second catalyst 235 becomes higher due to the supply of the exhaust gas having the lean air-fuel ratio to the second catalyst 235. Thus, the control in the fifth modified example becomes more effective as the adsorption amount of HC adsorbed by the second catalyst 235 increases. Therefore, the ECU 100 may estimate the HC adsorption amount of the second catalyst 235 on the basis of the temperature detected by the temperature sensor 236 and the temperature detected by the temperature sensor 238, or the air-fuel ratio detected by the air-fuel ratio sensor 239, and may perform the control in the fifth modified example if the estimated HC adsorption amount is greater than or equal to a predetermined amount.

Sixth Modified Example

In FIG. 1, particularly in a sixth modified example, the ECU 100 determines the addition amount of the fuel by the exhaust addition injector 233 on the basis of the air-fuel ratio detected by the air-fuel ratio sensor 239. Specifically, the ECU 100 determines the addition amount of the fuel by the exhaust addition injector 233 such that the rich depth r1 or the rich area S1 (refer to FIG. 5) becomes smaller than a current one if the air-fuel ratio detected by the air-fuel ratio sensor 239 is rich. In other words, the ECU 100 performs feedback control of reducing the addition amount of the fuel so that the rich depth r1 or the rich area S1 (refer to FIG. 5) becomes smaller than the current one if the air-fuel ratio on the downstream side of the second catalyst is rich. It is thus possible to reduce or prevent that one portion of the fuel passes through the second catalyst 235 and is released into the air. If the air-fuel ratio detected by the air-fuel ratio sensor 239 is rich, one portion of the fuel highly likely passes through the second catalyst 235 and the fuel is highly likely released into the air.

Seventh Modified Example

In FIG. 1, particularly in a seventh modified example, the ECU 100 calculates the amount of the fuel which passes through the second catalyst 235 (hereinafter referred to as a "passing through amount" as occasion demands) on the basis of the air-fuel ratio detected by the air-fuel ratio sensor 239, and detects a failure due to the degradation of the first catalyst 234 and the second catalyst 235 on the bass of the calculated passing through amount and the addition amount of the fuel by the exhaust addition injector 233. Specifically, the ECU 100 determines that the purification of the exhaust gas is not normally performed by the first catalyst 234 or the second catalyst 235 and that there is the failure due to the degradation of the first catalyst 234 or the second catalyst 235 if the proportion of the passing through amount to the addition amount of the fuel is higher than a predetermined proportion. Thus, according to the seventh modified example, it is possible to accurately detect the failure due to the degradation of the first catalyst 234 and the second catalyst 235.

Eighth Modified Example

In FIG. 1, particularly in an eighth modified example, the ECU 100 determines the addition amount of the fuel by the exhaust addition injector 233 on the basis of the air-fuel ratio detected by the air-fuel ratio sensor 239, and detects a failure due to the degradation of the first catalyst 234 and the second catalyst 235 on the basis of the determined supply amount. Specifically, the ECU 100 determines that there is the failure due to the degradation of the first catalyst 234 or the second catalyst 235 if the addition amount of the fuel which is determined on the basis of the air-fuel ratio detected by the air-fuel ratio sensor 239 is reduced by a predetermined amount or more (in other words, if the extent of the rich air-fuel ratio detected by the air-fuel ratio sensor 239 is high and if a reduced amount when the addition amount of the fuel is reduced due to the feedback control based on the air-fuel ratio is greater than or equal to the predetermined amount). Thus, according to the eighth modified example, it is possible to accurately detect the failure due to the degradation of the first catalyst 234 and the second catalyst 235.

Ninth Modified Example

In FIG. 1, particularly in a ninth modified example, the ECU 100 determines the addition amount of the fuel by the exhaust addition injector 233 on the basis of the air-fuel ratio detected by the air-fuel ratio sensor 239, and detects a failure due to the degradation of the first catalyst 234 and the second catalyst 235 on the basis of the air-fuel ratio detected by the air-fuel ratio sensor 239 after the determined addition amount of the fuel is added to the exhaust gas by the exhaust addition injector 233. Specifically, the ECU 100 determines that there is the failure due to the degradation of the first catalyst 234 or the second catalyst 235 if the extent of the rich air-fuel ratio detected by the air-fuel ratio sensor 239 is higher than a predetermined extent after performing the feedback control of reducing the addition amount of the fuel by the exhaust addition injector 233 on the basis of the air-fuel ratio detected by the air-fuel ratio sensor 239. In other words, the ECU 100 determines that the purification of the exhaust gas is not normally performed by the first catalyst 234 or the second catalyst 235 and that that there is the failure due to the degradation of the first catalyst 234 or the second catalyst 235 if the air-fuel ratio on the downstream side of the second catalyst is rich to the predetermined extent or higher even though the addition amount of the fuel by the exhaust addition injector 233 is reduced. Thus, according to the ninth modified example, it is possible to accurately detect the failure due to the degradation of the first catalyst 234 and the second catalyst 235.

As explained above, according to the embodiment, it is possible to appropriately control the temperature of the second catalyst 235 such as, for example, the filter catalyst disposed on the downstream side, while suppressing the thermal degradation of the first catalyst 234 such as, for example, the oxidization catalyst disposed on the upstream side of the exhaust passage, without causing, for example, the increase in manufacturing cost and the deterioration in mountability of the vehicle.

The present invention is not limited to the aforementioned embodiment, but various changes may be made, if desired, without departing from the essence or spirit of the invention which can be read from the claims and the entire specification. An exhaust gas purifying apparatus for an internal combustion engine, which involves such changes, is also intended to be within the technical scope of the present invention.

DESCRIPTION OF REFERENCE CODES

100 ECU
200 engine
230 exhaust system
231 exhaust manifold
232 exhaust tube
233 exhaust addition injector
234 first catalyst
235 second catalyst
236, 237, 238 temperature sensor
239 air-fuel ratio sensor
310 shaft-less swirler

The invention claimed is:

1. An exhaust gas purifying apparatus for an internal combustion engine, comprising:
    a first catalyst which is disposed in an exhaust passage of the internal combustion engine;
    a second catalyst which is disposed in the exhaust passage on a downstream side of the first catalyst;
    an exhaust addition injector disposed on an upstream side of the first catalyst and which is configured to supply a reducing agent into the exhaust passage;
    a temperature sensor configured to detect a bed temperature of the second catalyst, wherein the second catalyst has oxygen storage capacity,
    an electronic control unit programmed to:
    control the exhaust addition injector such that an air-fuel ratio on the upstream side of the first catalyst becomes momentarily rich, and
    determine a supply amount of the reducing agent by the exhaust addition injector on the basis of the detected bed temperature such that the reducing agent reacts with oxygen released from the second catalyst in a particular region out of a plurality of regions of the second catalyst which are arranged in a direction from the upstream side to the downstream side of the exhaust passage.

2. The exhaust gas purifying apparatus for the internal combustion engine according to claim 1, wherein the electronic control unit determines the supply amount depending on reaction efficiency of the reaction between the reducing agent and oxygen released from the second catalyst.

3. The exhaust gas purifying apparatus for the internal combustion engine according to claim 1, wherein the second catalyst has hydrocarbon adsorption capacity.

4. The exhaust gas purifying apparatus for the internal combustion engine according to claim 3, further comprising:
    a first exhaust gas temperature sensor configured to detect a temperature of exhaust gas in the exhaust passage on the downstream side of the second catalyst; and
    a second exhaust gas temperature sensor configured to detect a temperature of exhaust gas in the exhaust passage on the downstream side of the first catalyst and on the upstream side of the second catalyst;
    wherein the electronic control unit is further programmed to:
    estimate an adsorption amount of hydrocarbon adsorbed by the second catalyst on the basis of the temperature detected by the first exhaust gas temperature sensor, and the temperature detected by the second exhaust gas temperature sensor, and determine a supply amount of the reducing agent by the exhaust addition injector on the basis of the estimated adsorption amount.

5. The exhaust gas purifying apparatus for the internal combustion engine according to claim 3, further comprising:

an air-fuel ratio sensor configured to detect the air-fuel ratio in the exhaust passage on the downstream side of the second catalyst; and wherein the electronic control unit is further programmed to estimate an adsorption amount of hydrocarbon adsorbed by the second catalyst on the basis of the air-fuel ratio detected by the air-fuel ratio sensor, and to determine a supply amount of the reducing agent by the exhaust addition injector on the basis of the estimated adsorption amount.

6. The exhaust gas purifying apparatus for the internal combustion engine according to claim 3, wherein the electronic control unit determines a supply amount of the reducing agent by the exhaust addition injector such that amplitude of oscillation of the air-fuel ratio on the upstream side of the first catalyst gradually decreases at the end of the control of the exhaust addition injector.

7. The exhaust gas purifying apparatus for the internal combustion engine according to claim 1, further comprising:

an air-fuel ratio sensor configured to detect the air-fuel ratio in the exhaust passage on the downstream side of the second catalyst, the electronic control unit determining a supply amount of the reducing agent by the exhaust addition injector on the basis of the detected air-fuel ratio.

8. The exhaust gas purifying apparatus for the internal combustion engine according to claim 7, wherein the electronic control unit is further programmed to:

calculate a passing through amount of the reducing agent which passes through the second catalyst out of the entire reducing agent, on the basis of the detected air-fuel ratio; and detect a failure due to degradation of the first and second catalysts on the basis of the calculated passing through amount and the supply amount of the reducing agent by the exhaust addition injector.

9. The exhaust gas purifying apparatus for the internal combustion engine according to claim 7, wherein the electronic control unit is further programmed to detect a failure due to degradation of the first and second catalysts on the basis of the determined supply amount.

10. The exhaust gas purifying apparatus for the internal combustion engine according to claim 7, wherein the electronic control unit is further programmed to detect a failure due to degradation of the first and second catalysts on the basis of the air-fuel ratio detected by the air-fuel ratio sensor after the determined supply amount of reducing agent is supplied by the exhaust addition injector.

11. The exhaust gas purifying apparatus for the internal combustion engine according to claim 1, further comprising a shaft-less swirler configured to mix exhaust gas, in the exhaust passage on the downstream side of the first catalyst and on the upstream side of the second catalyst.

* * * * *